(12) United States Patent
Laurent et al.

(10) Patent No.: US 12,505,626 B2
(45) Date of Patent: Dec. 23, 2025

(54) AUGMENTED REALITY METHOD AND SYSTEM ENABLING COMMANDS TO CONTROL REAL-WORLD DEVICES

(71) Applicant: InterDigital CE Patent Holdings, SAS, Paris (FR)

(72) Inventors: Anthony Laurent, Vignoc (FR); Vincent Alleaume, Pace (FR); Caroline Baillard, Saint Sulpice la Foret (FR); Matthieu Fradet, Chanteloup (FR); Pierrick Jouet, Rennes (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 197 days.

(21) Appl. No.: 18/271,776

(22) PCT Filed: Jan. 10, 2022

(86) PCT No.: PCT/EP2022/050303
§ 371 (c)(1),
(2) Date: Jul. 11, 2023

(87) PCT Pub. No.: WO2022/152636
PCT Pub. Date: Jul. 21, 2022

(65) Prior Publication Data
US 2024/0127552 A1 Apr. 18, 2024

(30) Foreign Application Priority Data
Jan. 12, 2021 (EP) ..................... 21305026

(51) Int. Cl.
*G06T 19/00* (2011.01)
*G06F 3/16* (2006.01)
*G06V 10/20* (2022.01)

(52) U.S. Cl.
CPC ............ *G06T 19/006* (2013.01); *G06F 3/167* (2013.01); *G06V 10/255* (2022.01)

(58) Field of Classification Search
None
See application file for complete search history.

(56) References Cited

U.S. PATENT DOCUMENTS 5,689,717 A * 11/1997 Pritt ................. G06T 11/00
 345/619
7,031,961 B2 * 4/2006 Pitkow ............... G06F 16/9562
(Continued)

FOREIGN PATENT DOCUMENTS

EP 3332546 A1 6/2018
EP 3639119 A1 4/2020

OTHER PUBLICATIONS

Chopra, Shreya, "Evaluating User Preferences for Augmented Reality Interactions for the Internet of Things", PRISM: University of Calgary's Digital Repository, The Vault: Electronic Theses and Dissertations, Master's thesis, Calgary, Alberta, Canada, Dec. 20, 2019, 155 pages.

(Continued)

*Primary Examiner* — Robert J Craddock
(74) *Attorney, Agent, or Firm* — VOLPE KOENIG

(57) ABSTRACT

A camera captures part of a surrounding scene to obtain a user view, disambiguating information uniquely identifying at least one controllable device or group of controllable devices in a set of controllable devices of a given type or at least one location or direction for a mobile controllable device is obtained, the user view and the disambiguating information relating to at least one controllable device overlaid on the user view are displayed on a display, a command intended to control at least one controllable device is received, wherein a command including at least part of the (Continued)

disambiguating information and a message based on the command is sent towards a corresponding controllable device.

20 Claims, 13 Drawing Sheets

(56) References Cited

U.S. PATENT DOCUMENTS

| | | | |
|---|---|---|---|
| 7,692,655 B2* | 4/2010 | Ni | G06T 17/05 |
| | | | 345/442 |
| 7,697,014 B2* | 4/2010 | Dolph | G06F 3/04817 |
| | | | 345/619 |
| 10,031,722 B1 | 7/2018 | Mutagi et al. | |
| 10,466,794 B2 | 11/2019 | Maeda et al. | |
| 10,726,463 B2 | 7/2020 | Cho et al. | |
| 10,769,438 B2 | 9/2020 | Bendale et al. | |
| 10,782,848 B2 | 9/2020 | Issayeva et al. | |
| 10,990,505 B2* | 4/2021 | Papp | G06F 11/3624 |
| 2017/0228936 A1 | 8/2017 | Goslin et al. | |
| 2020/0236176 A1* | 7/2020 | Park | G06F 3/167 |

OTHER PUBLICATIONS

Huynh et al., "Semantic Labeling and Object Registration for Augmented Reality Language Learning", Institute of Electrical and Electronics Engineering (IEEE), 2019 IEEE Conference on Virtual Reality and 3D User Interfaces (VR), Osaka, Japan, Mar. 23, 2019, 2 pages.

* cited by examiner

AUGMENTED REALITY METHOD AND SYSTEM ENABLING COMMANDS TO CONTROL REAL-WORLD DEVICES

CROSS REFERENCE TO RELATED APPLICATIONS

This application is a U.S. National Stage Application under 35 U.S.C. § 371 of International Patent Application No. PCT/EP2022/050303, filed 10 Jan. 2022, which is incorporated herein by reference in its entirety.

This application claims priority to European Application No 21305026.3, filed 12 Jan. 2021, which is incorporated herein by reference in its entirety.

TECHNICAL FIELD

The present disclosure relates generally to Augmented Reality (AR) and in particular to user control of real-world devices with the aid of AR.

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Augmented Reality (AR) technology, which consists in adding virtual content to a live view of a surrounding real-world environment, is evolving very rapidly. It has become ubiquitous in the industry, and AR-based end user applications—e.g. for gaming, interior design, virtual try-on—are more and more popular.

AR also enables users to control connected objects located in an environment, such as smart objects or AR-based robotic systems. Commands are typically input via hand gestures when using smartglasses or by clicking on the screen of a tablet or smartphone, notably when the commands relate to a subset of a group.

However, voice is a common type of interface for interaction with digital systems. This is often seen as very user-friendly since it is based on natural language. New systems include virtual or intelligent personal assistants to play music, search information or act as a hub for the home network to control smart elements (e.g. iPhones with Sid, Amazon Echo, and Google Home). It is expected that voice will become a prevalent way of communicating with AR systems too.

A drawback with voice commands is that they do not always allow precision, for example when selecting one shutter or one light among several, or asking a robot to move to a specific position. The user may need additional data (e.g. a label) to identify a device or a coordinate system to precisely localize a position.

It will thus be appreciated that there is a desire for a solution that addresses at least some of the shortcomings of voice commands in AR systems. The present principles provide such a solution.

Summary of Disclosure

In a first aspect, the present principles are directed to a system including a camera configured to capture a user view of a scene surrounding the camera, a display, memory configured to store instructions, executable by a processor, and to store parameters, and at least one hardware processor configured to execute the instructions to detect controllable objects in the user view and, on condition that the controllable objects include multiple controllable objects of a same object type, obtain disambiguating information for the multiple controllable objects of the same object type, the disambiguating information suitable for uniquely identifying at least two subsets of controllable objects of the same object type, and cause the disambiguating information to be displayed, overlaid on the user view, on the display.

In a second aspect, the present principles are directed to a method including detecting controllable objects in a user view captured using a camera and, on condition that the controllable objects comprise multiple controllable objects of a same object type, obtaining disambiguating information for the multiple controllable objects of the same object type, the disambiguating information suitable for uniquely identifying at least two subsets of controllable objects of the same object type, and displaying, overlaid on the user view, the disambiguating information on a display.

In a third aspect, the present principles are directed to a system including a camera configured to capture a user view of a scene surrounding the camera, a display, memory configured to store instructions, executable by a processor, and to store parameters, at least one hardware processor configured to execute the instructions to detect a plurality of controllable objects in the user view, receive a user command specifying a type of object to be controlled, on condition that the plurality of controllable objects include a single controllable object of the type of object, send a control message corresponding to the user command intended for the single controllable object of the type of object, and on condition that the plurality of controllable objects comprise a plurality of controllable objects of the type of object, obtain disambiguating information for the plurality of controllable objects of the type of object, the disambiguating information suitable for uniquely identifying at least two subsets of the plurality of controllable objects of the type of object and cause the disambiguating information to be displayed, overlaid on the user view, on the display.

In a fourth aspect, the present principles are directed to a method including detecting a plurality of controllable objects in a user view captured by a camera, receiving a user command specifying a type of object to be controlled, on condition that the plurality of controllable objects includes a single controllable object of the type of object, sending a control message corresponding to the user command intended for the single controllable object of the type of object, and on condition that the plurality of controllable objects comprise a plurality of controllable objects of the type of object obtaining disambiguating information for the plurality of controllable objects of the type of object, the disambiguating information suitable for uniquely identifying at least two subsets of the plurality of controllable objects of the type of object, and causing the disambiguating information to be displayed, overlaid on the user view, on the display.

In a fifth aspect, the present principles are directed to a system including a camera configured to capture a user view of a scene surrounding the camera, a display, memory configured to store instructions, executable by a processor, and to store parameters, at least one hardware processor configured to execute the instructions to cause spatial disambiguating information to be displayed on the display, overlaid on the user view, the spatial disambiguating information suitable for indicating locations, receive a user command specifying a mobile controllable object to be controlled, an action and at least one location, and send a control message corresponding to the user command and intended for the mobile controllable object.

In a sixth aspect, the present principles are directed to a method including causing spatial disambiguating information to be displayed on a display, overlaid on a user view, the spatial disambiguating information suitable for indicating locations, receive a user command specifying a mobile controllable object to be controlled, an action and at least one location, and send a control message corresponding to the user command and intended for the mobile controllable object.

In a seventh aspect, the present principles are directed to a non-transitory computer-readable storage medium storing instructions that, when executed, cause at least one hardware processor to perform a method of the second aspect.

In a eighth aspect, the present principles are directed to a non-transitory computer-readable storage medium storing instructions that, when executed, cause at least one hardware processor to perform a method of the fourth aspect.

In a ninth aspect, the present principles are directed to a non-transitory computer-readable storage medium storing instructions that, when executed, cause at least one hardware processor to perform a method of the sixth aspect.

BRIEF DESCRIPTION OF DRAWINGS

Features of the present principles will now be described, by way of non-limiting example, with reference to the accompanying drawings, in which.

DESCRIPTION OF EMBODIMENTS

The present principles provide a system for generating and displaying information (e.g. metadata) to a user in AR about the surrounding environment to facilitate the control of devices, in particular using voice (i.e. vocal) commands.

The displayed information may for instance be a specific, perhaps unique, label (i.e. identifier) associated with each smart device (or each device of a kind such as shutters, lights and power switches) in the viewed environment.

Another example of displayed information is the overlay of a 2D or 3D grid on the viewed scene, where the grid subdivides a space into a set of identified cells. In the description, the expression "scene" typically refers to the real world environment and "user view" typically refers to what is displayed or visible to the user through an AR device; typically, a current user view displays part of a scene.

The system can use available data about the environment such as a 3D model, a room bounding shape and detected planes (e.g. floor, walls, ceiling, table . . . ).

When a new controllable device is added to the system, it can be registered, automatically or explicitly by the user, with information such as position, label, bounding shape and model. The information will typically depend on the type of use case, since identifying a light or a shutter (i.e. static device) is different from identifying a location, position or area in a room to which a robot (i.e. mobile device) can move. The information typically also depends on the type of device. For example, a drone and a robot do not move in the same space and two robots of different size may not be able to reach the same areas in a room. As another example, lights and shutters have different properties and two different light sources may have different properties such as the capability or not to change intensity or colour.

Put another way, the information can depend on the device type (e.g. numbers for lights and colours for shutters) and disambiguates devices of the same type and/or groups of devices of the same type and/or locations or directions to which a mobile device can move and turn etc.

Figure 1:
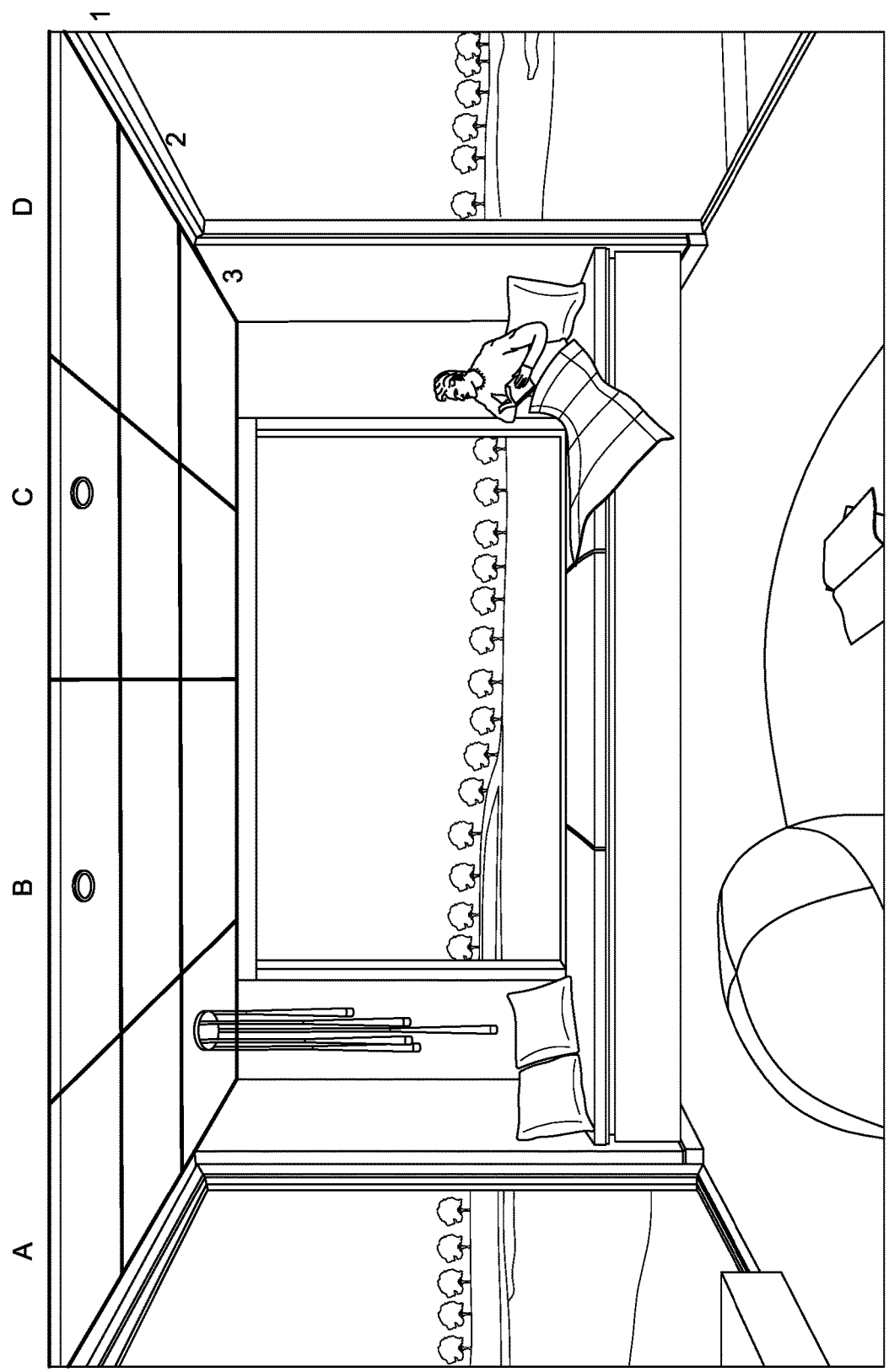
FIG. 1 illustrates a first example of a user view according to an embodiment of the present principles.

FIG. 1 illustrates a first example of a user view according to an embodiment of the present principles. The example shows an environment over which the system has overlaid a 2D grid onto a space, in the example the ceiling, to enable selection of individual light sources (as examples of controllable devices), in the present example the lamps in squares A3, B1 and C1.

Figure 2:
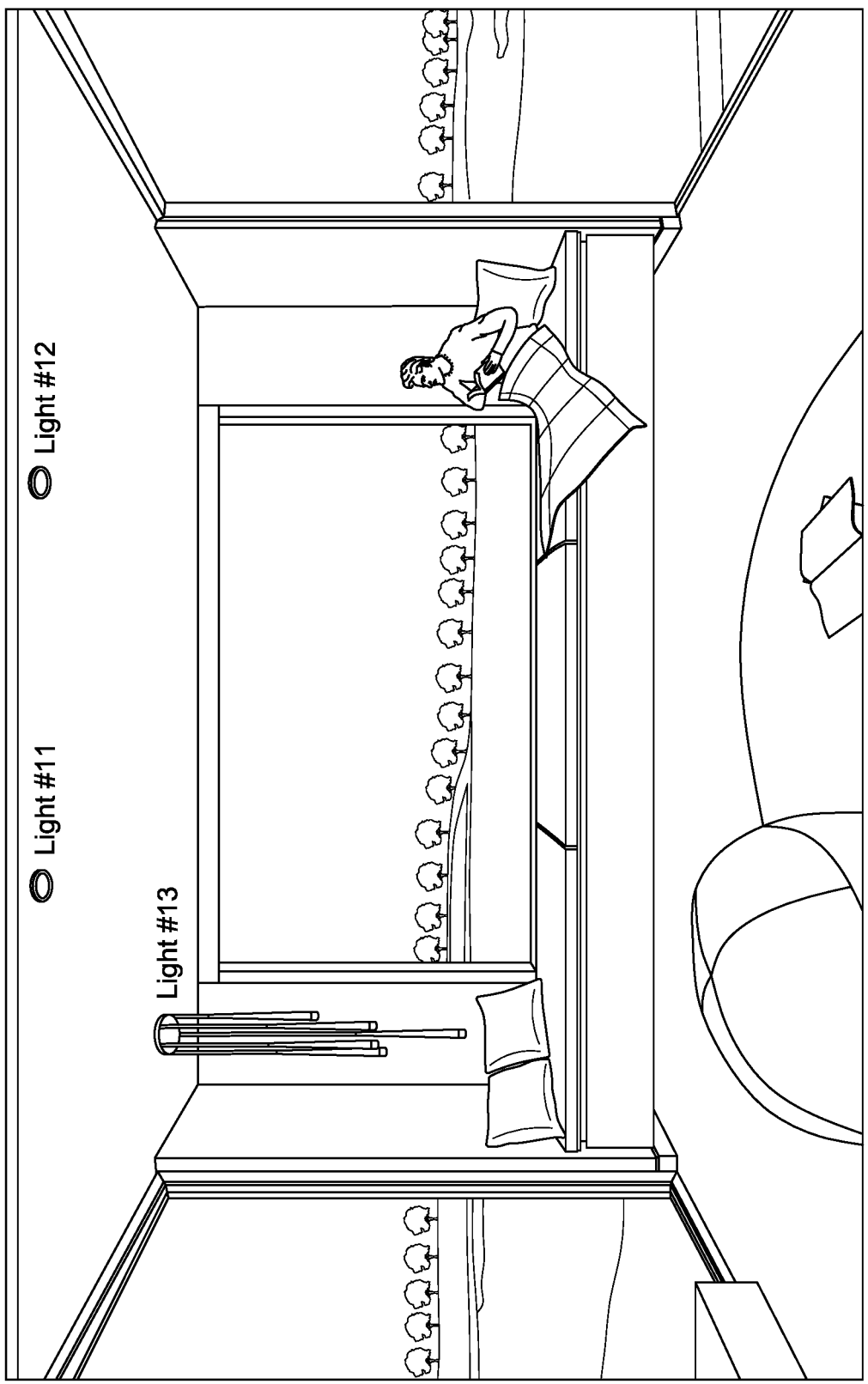
FIG. 2 illustrates a second example of a user view according to an embodiment of the present principles.
Figure 3:
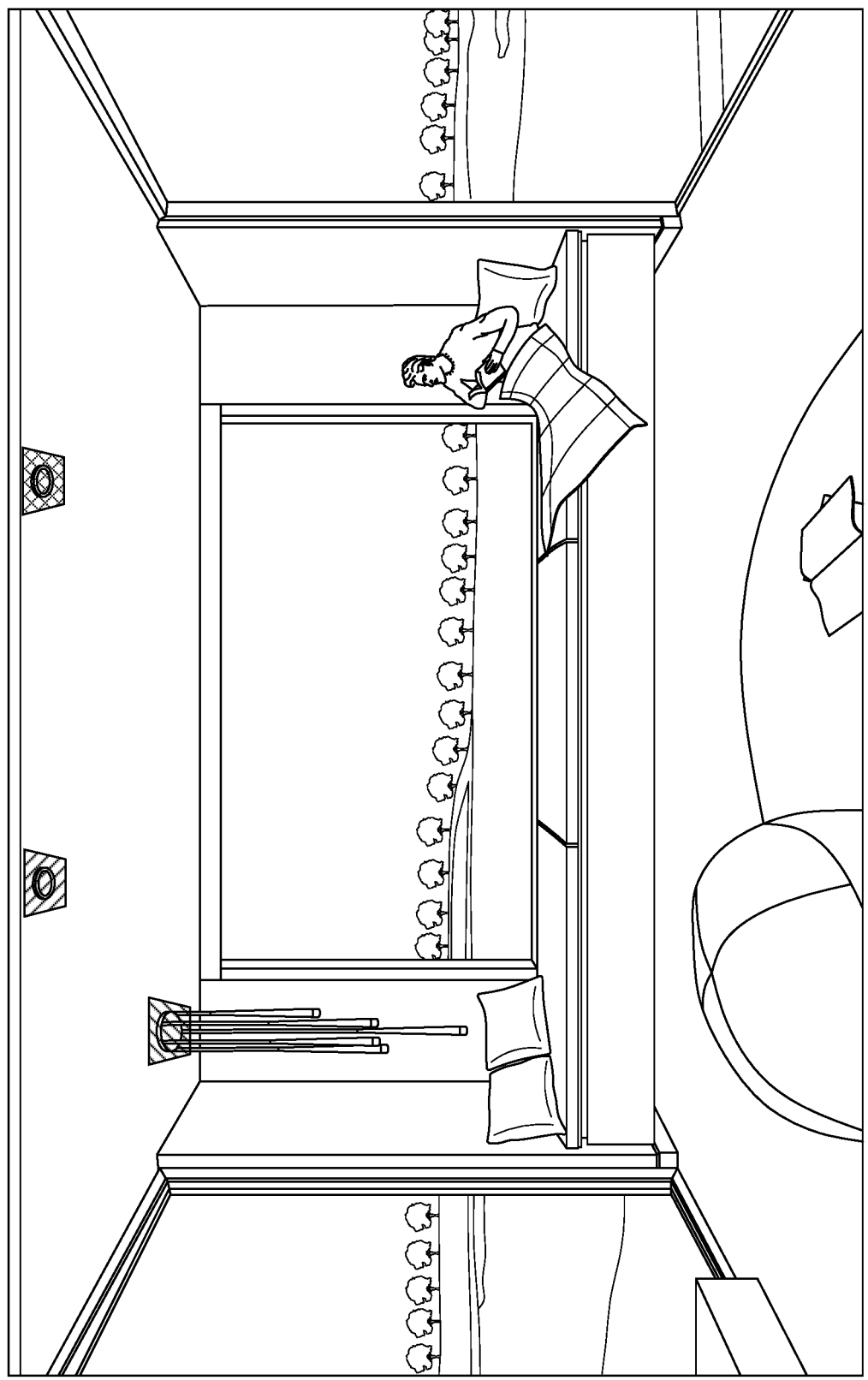
FIG. 3 illustrates a third example of a user view according to an embodiment of the present principles.

FIGS. 2 and 3 illustrate a second and a third examples of user views according to an embodiment of the present principles. In FIG. 2, labels—Light #11, Light #12 and Light #13—are displayed in the vicinity of the light sources in the environment that is displayed. In FIG. 3, colours (illustrated by different hatchings) are used as identifiers for the light sources. In this example, a coloured shape covers at least part of its corresponding light source.

In an embodiment, the system can provide a plurality of different types of information, such as for example that in FIG. 1 and FIG. 2. The user can be allowed to personalize the rendering, i.e. the type of information, and also to switch from one mode (e.g. labels) to another (e.g. colours) to select a preferred one, which can be changed at a later time.

The user is then able to use a voice command, e.g. "turn on Light #11," that can be unambiguously interpretable by the system. Depending on the presentation mode (i.e. the displayed information), the voice command can for example be of the following types:

"Switch on/off the light in B1"

"Switch on/off the light #13"

"Switch on/off the red light"

Figure 4:
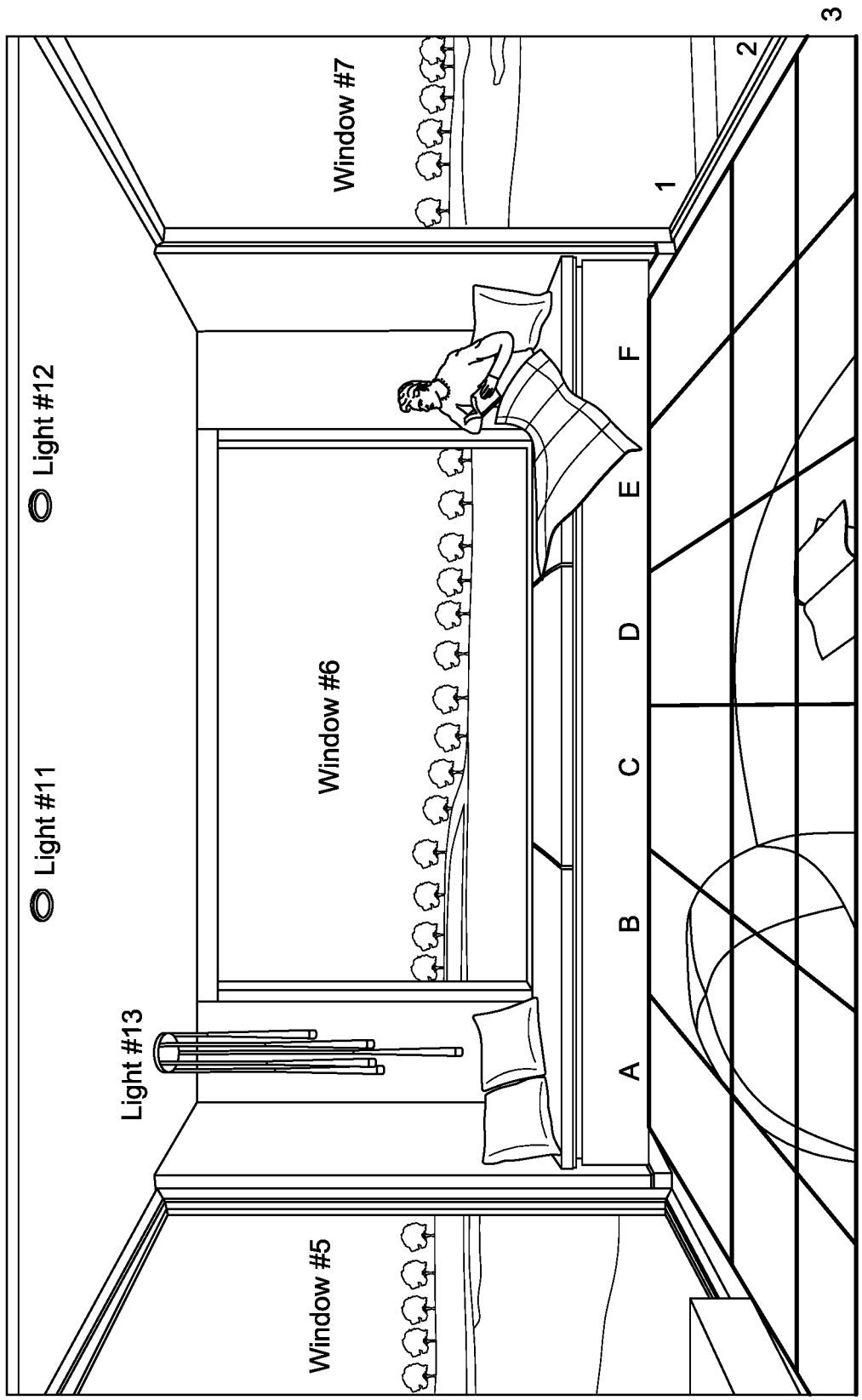
FIG. 4 illustrates a fourth example of information according to an embodiment of the present principles.

FIG. 4 illustrates a fourth example of information according to an embodiment of the present principles. In this example, a user can, using the displayed information, control the lights, the shutters and a robot.

Examples of voice commands that may be used in the environment displayed in FIG. 4 are:

"Close/open the shutter for Window #5"
"Switch on/off Light #11"
"Robot vacuum cleaner: go to A1"
"Robot vacuum cleaner: clean the areas A2 and A3",
"Robot vacuum cleaner: clean [the rectangle] A2 to C4"

In an embodiment, the system allows the creation of groups of controllable devices so that these may be controlled using a single command. For example, this can allow the creation of a group with all the lights of the living room and another group with all the lights of the house. Another example is for the user to select displayed device identifiers and use these in a specific command together with a group identifier to create a group, e.g. "Create group 'Mood lights' including Light #11 and Light #12".

In an embodiment, the user can personalize the information presentation for a given mode, for example to change the granularity of the grid (i.e. the cell size).

The system can also work outdoors, for example to control outdoor lights, parts of an irrigation system, a robot mower or a drone, such as with the command, "Mower: mow areas F3 to F6."

In an embodiment, information can be valid only as long as it is displayed in the current user view. This can enable reuse of information such as labels or colours. In another embodiment, information can be persistent, so that for example Light #11 remains labelled as such until the information is changed (e.g. by user selection). This can enable the voice commands using the information also when the information is not displayed, such as if the display is disabled (e.g. switched off) or if the device is out of sight. Different types of information can obey different rules; for example in a system, labels can be persistent while colours are not. In an embodiment, information can be semi-persistent, for example valid for a short time (e.g. 1 s or 3 s) after no longer being in the user view. This can for example enable the user to take a quick look around the environment to search for previously non-displayed controllable devices and then use recently displayed information in a voice command.

Figure 5:
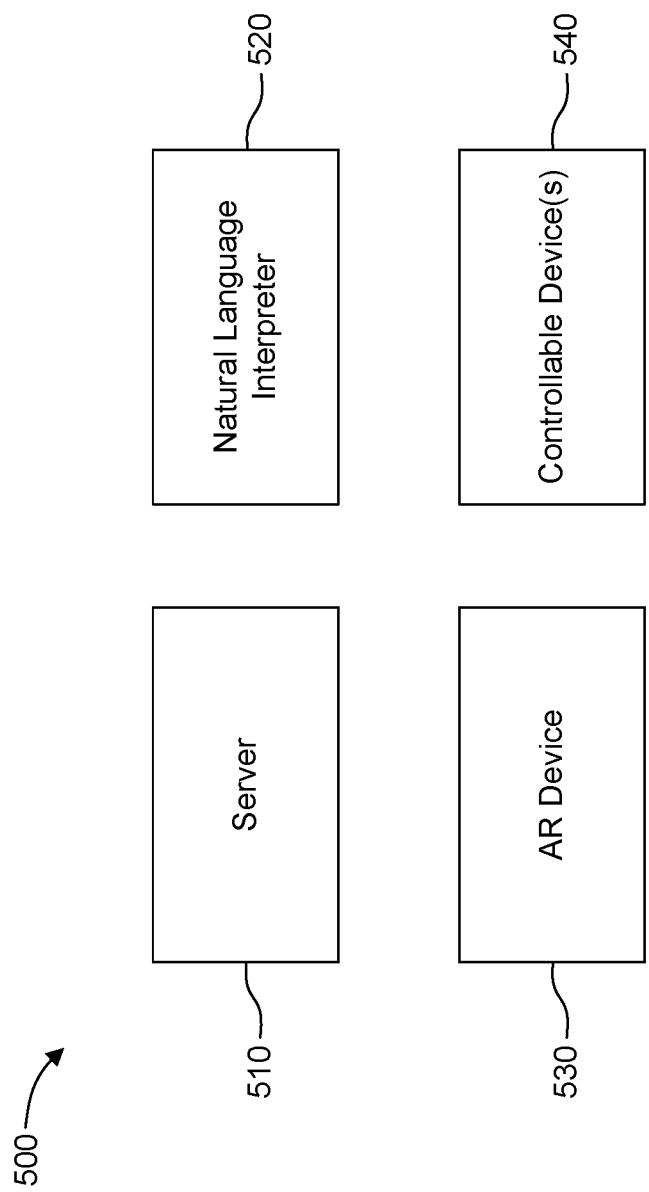
FIG. 5 illustrates roles of a system according to an embodiment of the present principles.

FIG. 5 illustrates roles of the system 500 according to an embodiment of the present principles. The system 500 includes a server 510, a natural language interpreter 520, at least one AR device 530 and at least one controllable device 540.

The natural language interpreter 520 can be implemented in the server 510 or the AR device 530. An AR device can be any suitable device capable of providing AR functionality by overlaying information over a scene of an environment (e.g. captured and displayed or optically "passed through"), for example a smartphone, a tablet, and smart glasses running an appropriate application or program. A controllable device 540 can be static (but, for certain devices, moveable) such as a shutter or a lamp, or mobile such as a robot vacuum cleaner, a robot window cleaner, a drone or a toy. A controllable device can alter a state of at least one of its aspects, the light of a light bulb can for example be on or off, in response to a received command.

The server 510 and the AR device 530 typically includes a communication interface for communicating with other roles of the system, memory, at least one hardware processor for performing the method of at least one embodiment described herein. The AR device typically also includes a user interface with a camera to capture a scene, a display to display the user view of the scene. The AR device 530 can further include a microphone for receiving voice commands, but the microphone can also be external (e.g. included in another device configured to receive voice commands). In short, the hardware of such devices can be that of suitable existing devices; as such, it will not be further described.

As described herein, the system 500 generates information for display on the AR device 530 through which a user can enter voice commands that are interpreted by the natural language interpreter 520 into data that can be interpreted by the server 510, which, if needed, may translate the data into device commands that are sent to the corresponding controllable device(s) 540.

The server 510 is able to communicate with at least some if not all of the other roles in the system 500. It is noted that in some embodiments, it is not necessary to communicate with all other roles; for example if the natural language interpreter 520 is implemented as part of the AR device 530, then it may not be necessary for the server to receive information from the AR device role (if it is sufficient to pass through the natural language interpreter).

As further mentioned, the information can be specific to a device. It can also be modified, possibly in response to a user command, such as to change a granularity of the information (e.g. provide a finer grid or ungroup grouped devices) to enable more precise commands.

It is noted that the need to identify a static controllable device can be patent only if there is a risk of selection ambiguity, in other words only when there are several devices of the same type in a displayed scene with no clear way of distinguishing between them without additional information. This typically applies to devices such as shutters and bulbs/lights; if there is a single TV set in the living room (which is generally the case), the system may be configured to recognize the voice command "turn ON/OFF the TV in the living room".

In an embodiment, the system can accept a first voice command and then, only if the command is judged to be ambiguous, display the information (or a subset of the information, for example relating to controllable devices of the kind indicated in the first voice command) in the user view. In a variant, the information is displayed in response to a specific voice command, e.g. "Display device identifiers."

As mentioned, the system 500 includes a natural language interpreter 520 capable of recognizing and converting a voice command into a command that can be interpreted by the server 510. This can for example be achieved by first converting captured speech to text that is input for syntax analysis (which implies the capability of being able to interpret the vocabulary associated with and specific to the various controllable devices) and then converting the analysed text to one or more commands compatible with the server 510.

The voice commands are captured by a microphone that for example can be embedded on the AR device 530 or on a dedicated vocal assistant device (e.g. Google Home, Amazon Alexa, a Set-Top-Box, or a gateway). Natural language interpreters are well-known in the art and will not be described further.

The system 500 can use a coordinate system, e.g. World Coordinate System (WCS), in which coordinates of elements in a scene are expressed. The coordinate system is a reference coordinate system throughout the system. Even if a device (AR device or mobile controllable device) has its own coordinate system to estimate its localization/pose, it must be relocalized in the reference coordinate system. To do so, the specific coordinates can be converted to the reference coordinate system and vice-versa and stored. The conversion can be performed by the server, the AR device or the controllable devices.

Mathematically speaking, a transfer matrix can be used to convert between these different coordinate systems. The transfer matrix can be computed by the server 510 or the controllable device 540. There are different known ways to compute the transfer matrix, for example using a marker, detecting scene features or detecting one or more objects to obtain one or more, preferably at least three, common reference points between the coordinate systems. When a controllable device registers on the server, it can receive data (e.g. element to detect and its pose in the reference coordinate system) enabling computation of the transfer matrix or transmit data (e.g. a capture of the scene and the camera pose) for the server to compute the transfer matrix and provide this to the controllable device.

Generation of the information can rely on environment data or scene data such as:
  a 3D scene model,
  main planes of a scene such as floor, walls, ceiling, and tables,
  room corners,
  objects of interest (e.g. a window) that are identified, localized and labelled.

The server can generate such data itself through for example semantic scene analysis or geometric analysis, or obtain the data from an external device having analysed the scene. The analysis as such is known in the art and will not be described.

The server can also store or have access to device data, for example through communication with the controllable devices. This can make it possible for the server to have access to various device data such as:
  state of its aspects (e.g. ON/OFF for a bulb or shutter, OFF/STOPPED/MOVING for a robot),
  position in a coordinate system for the mobile devices (either expressed in the reference coordinate system or in the specific coordinate system of the mobile device, the latter typically necessitating some way of conversion to the reference coordinate system by the server).

The server can also send control commands to controllable devices, for example to instruct a controllable device to change one or more of its states or to provide one or more positions or areas the controllable device should move to or over or process (e.g. mow or vacuum).

System Configuration

A system according to the present principles could have the following configuration to display AR information to a user. The example configuration enables voice commands based on position, not identifiers (i.e. labels), but it will be appreciated that the configuration can be extended to include this and other features.

To control a (controllable) device, a user needs some way to identify it. To enable this, the device should be added (i.e. registered) to the system so that at least some of its parameters are known to the system. The parameters depend on the type of device.

For a static controllable device, the parameters include the type of device (light, shutter . . . ) and the position. These parameters enable the user to issue voice commands such as "Switch on/off the light located in D3".

There are several ways to register a device's position in the reference coordinate system. As a first example, a user can indicate the position of the device in an editor, possibly implemented on the AR device, displaying the scene (e.g. in 3D). In a second example, the position can be indicated using an AR application embedding the 3D scene model superimposed with the real environment and rendered transparently: the user stands in the room and selects the controllable device position for example by clicking on it; technically speaking, as the 3D model is superimposed on the real environment, when the user clicks on the screen, a ray is thrown/cast and the coordinates are those of the intersection point with the 3D mesh. In a third example, a tool having segmented the scene and having recognized and labeled elements enables the user to associate the physical controllable devices with the elements identified by the tool. Controllable devices can also be discoverable via a network (using e.g. UPnP, Bluetooth or Zigbee), typically the network used by the system, and its parameters can also be obtained this way.

For a mobile controllable device, two parameters typically include its label (i.e. identifier) and the space in which it can move (e.g. an horizontal plane, a vertical plane, or a 3D volume).

The system allows association of a human readable/understandable label with each controllable device. The user can use the label in the voice commands to control the device. For instance, a robot vacuum cleaner can be labelled (i.e. identified) as "RVC" or "RVC 1". It is noted that when there are more than one device of a specific type, identifying the devices individually can help avoid ambiguity. When there is a single device of a type, however, the label can in some cases be superfluous.

For mobile devices, the voice commands requiring additional information in AR mainly relate to moves or direction changes, e.g. the user orders a robot to move to a given location or to move throughout a given area, i.e. to follow a path. The position data are related to the scene and not the device per se; as an example, the user can issue a voice command such as "RVC: move to B8" and "Security camera 4: turn towards D5".

Moves and direction changes can enable certain scenarios with sequences of commands such as for example one or more of: "Drone: move to C7," "Drone: take one photo in direction X," "Drone: perform time-lapse photography in direction Y for ten minutes," "Drone: take a clockwise 360° photo starting in direction Z." A direction can for example be made with reference to a grid, using a compass bearing or by indicating a scene feature or a controllable device.

In an embodiment, for a mobile controllable device, the information (e.g. the grid) can be hidden until (or modified after) reception of a beginning of a voice command identifying the mobile controllable device. This can permit display of the areas reachable by the mobile controllable device.

It is noted that in the example configuration that does not use labels, locations are used to identify the controllable devices. From environment data, the system retrieves information to generate, for example, one or more grids, such as a 3D grid matching the bounding shape of the scene, the 3D grid being delimited by the walls, the floor and the ceiling, or a set of 2D grids, for example for the floor, the ceiling, one per wall, one per horizontal plane (e.g. table). A grid displays a plane or room subdivided into a set of cells (2D tiles or 3D cubes or "voxels").

Figure 6:
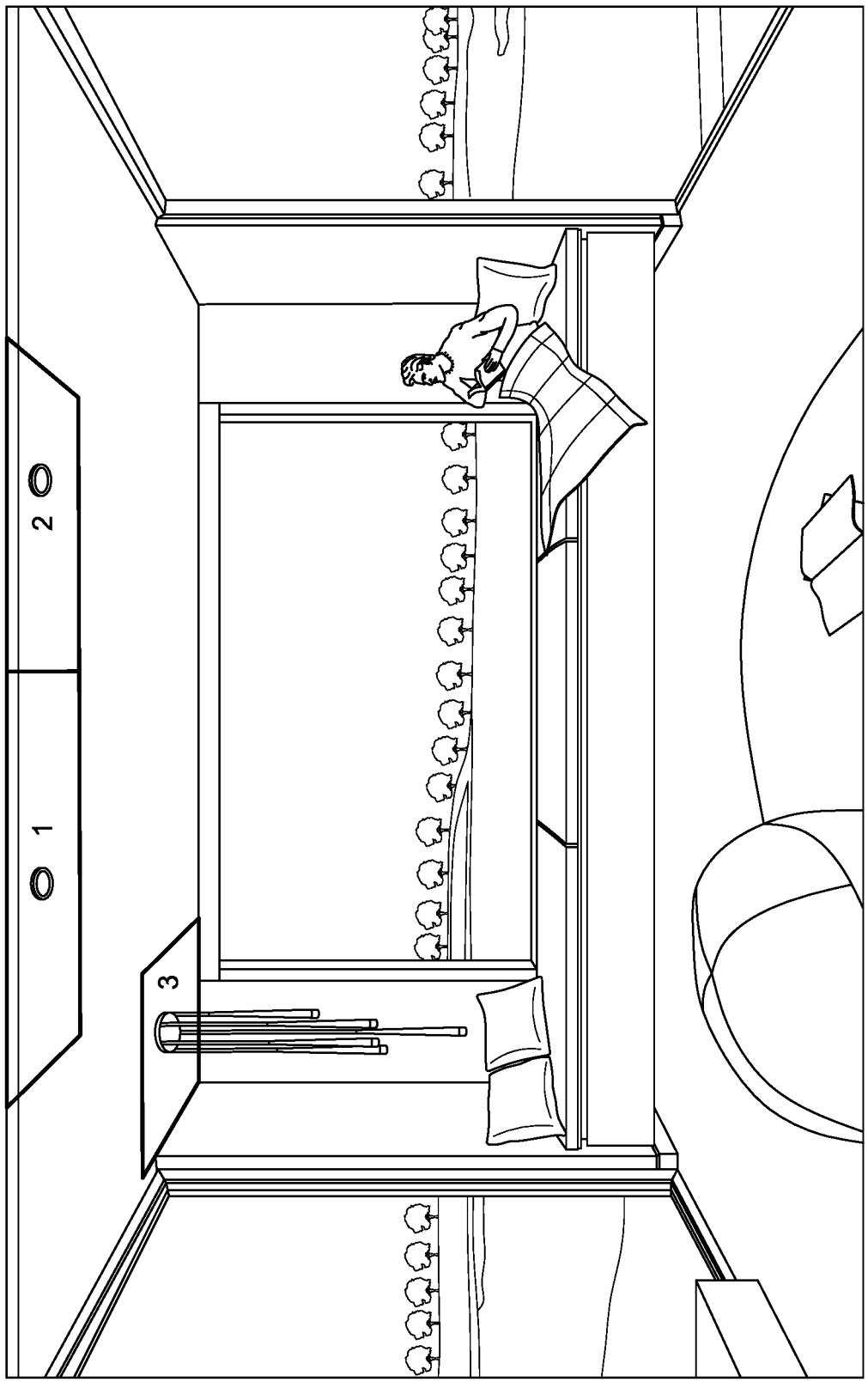
FIG. 6 illustrates a ceiling grid with two disjoint subgrids used in an embodiment of the present principles.

The server can determine the type of grid which is relevant for the user with respect to a context. For example, it can be sufficient to display only the 2D grid of the floor to control a RVC. On the other hand, to identify a light, the system can display the complete grid of the planes containing lights or only the cells (2D or 3D) containing lights. On the AR device, the AR application can then display the grids superimposed on the real environment. FIG. 1 illustrates a grid covering the ceiling with cells containing lights and empty cells. FIG. 6 illustrates a ceiling grid with two disjoint subgrids used in an embodiment of the present principles, a first with cells 1 and 2 and a second with cell 3; each cell includes a light.

Figure 7:
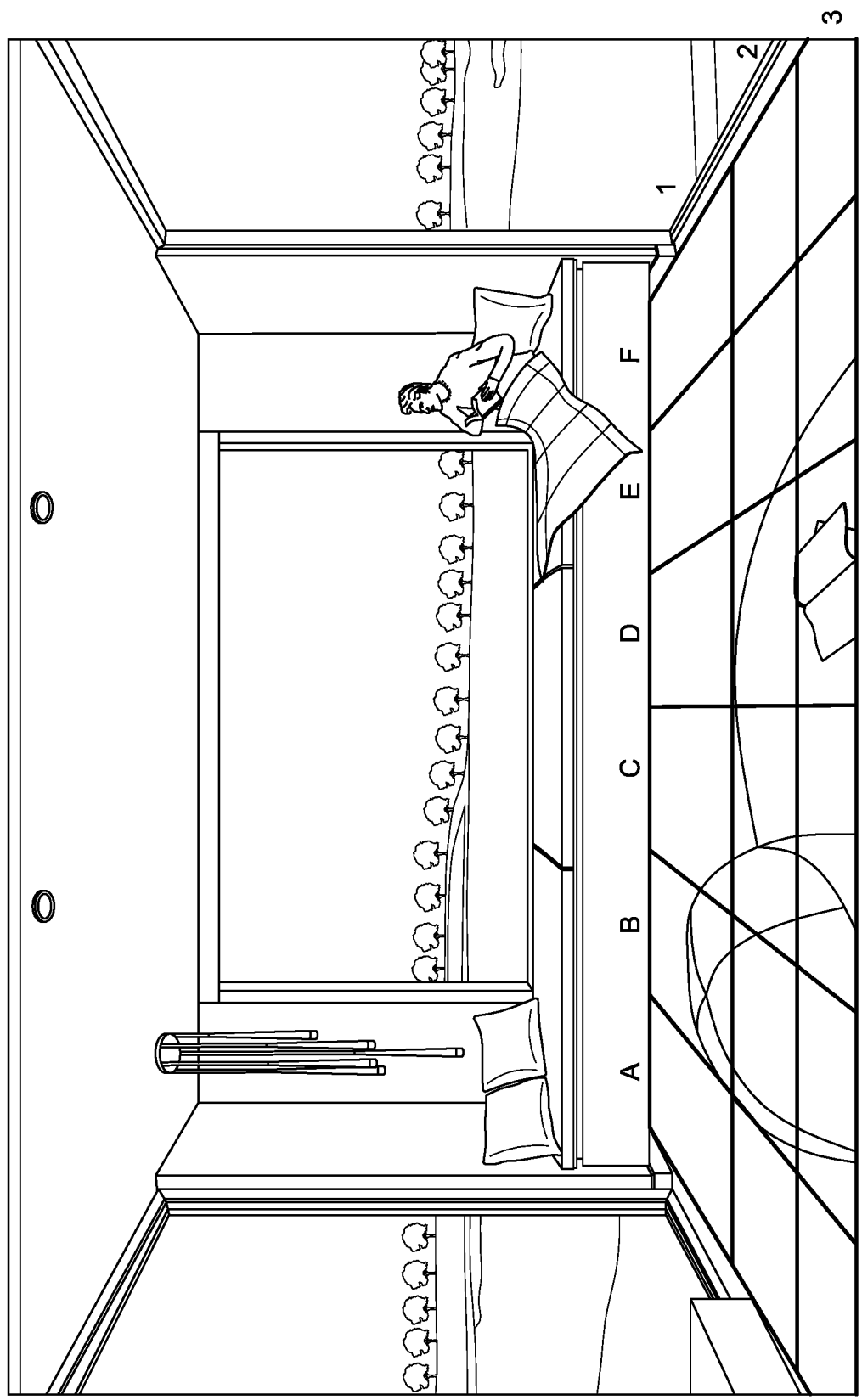
FIG. 7 illustrates a floor grid used in an embodiment of the present principles.

As mentioned, for a mobile device a voice command can include the target/destination position and orientation (i.e. the pose) or the area to move in and optionally its current position or the path to follow. To enable such voice commands, the grid can be adapted to the type of mobile device. The grid may be a 2D grid superimposed on the floor, the ceiling, the walls or any other plane (e.g. table). For example, a grid superimposed onto the floor is suitable for a robot vacuum cleaner. For a flying drone, the grid can also be in 3D. FIG. 7 illustrates a floor grid used in an embodiment of the present principles.

In at least one embodiment, the user can personalize the rendering of the grid, by changing for example the cell format or size. The user can also personalize how grid identifiers are presented, some examples being:
  Identification of rows and columns (as illustrated in FIG. 7),
  Use of a different color for each cell,
  Use of a distinct identifier for each cell,
  Identification of rows and columns using reference coordinates (e.g. "Move to X=2.3 m and Y=1.2 m")

For the sake of legibility, the system could also allow the user request display of a grid corresponding to part of the plane or volume.

Figure 8:
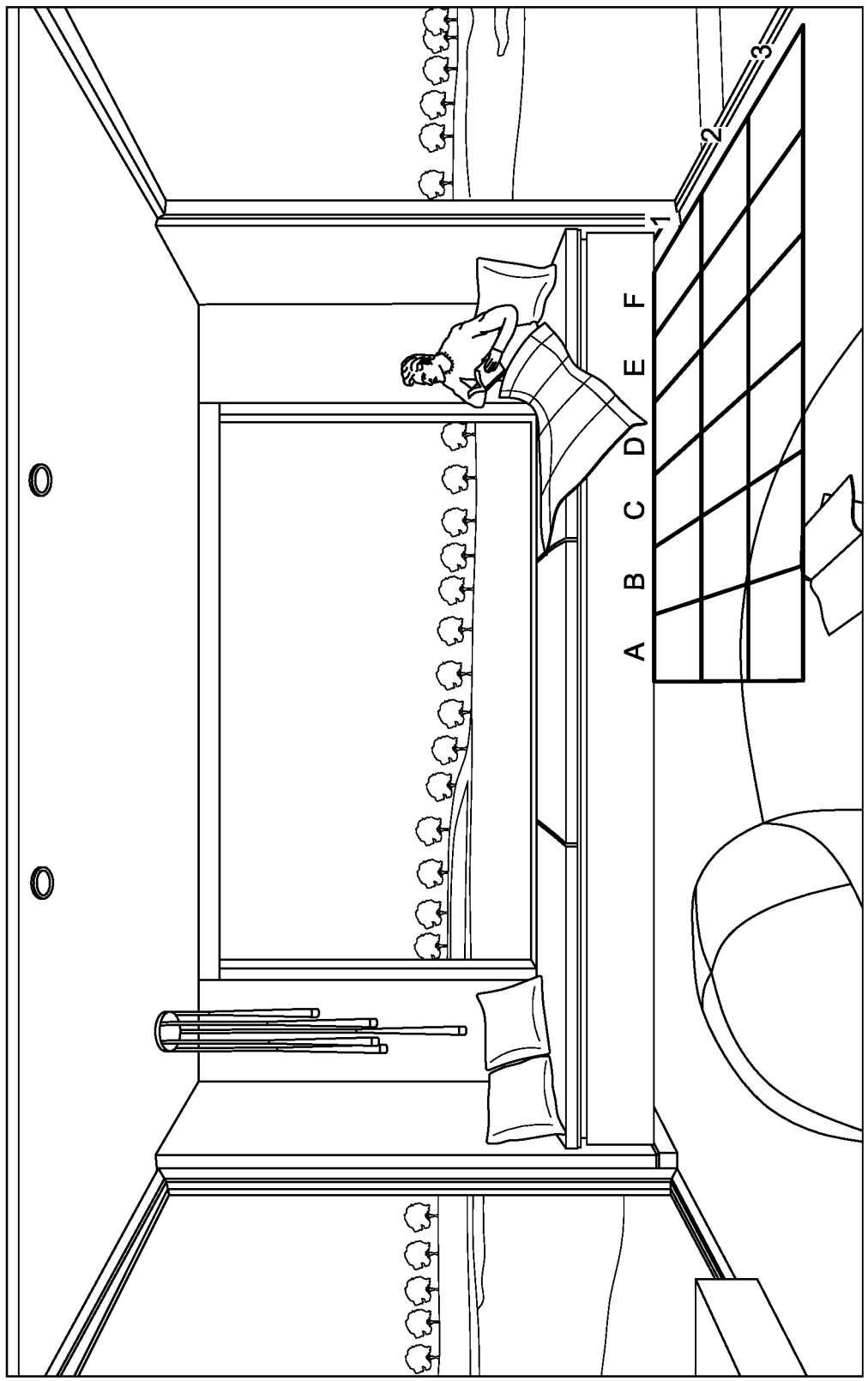
FIG. 8 illustrates an overlaid grid with higher granularity used in an embodiment of the present principles.

In an embodiment, the user is able to modify the grid configuration at any time depending on the type of command. Examples include:
  A default grid with one cell including two lights that can be changed to two cells each including one light.
  The possibility to refine part of a grid (e.g. cells C3 and C4) to enable better precision. In this case, the mentioned cells are replaced by a grid with higher granularity. FIG. 8 illustrates an overlaid grid with higher granularity.
  Removal, upon user request, of all but the selected cells, e.g. cells D5 and E5.

When personalizing a grid, the new grid can be computed by the server or the AR device itself. If computed by the AR device, it can inform the server of the new correspondence between the visual information and the reference coordinates, since the server needs indeed this information to convert the information about the position information given in the voice command (e.g. grid cell identifier, coordinate, color . . . ) to reference coordinates.

As mentioned, the described, 'basic' configuration does not for example enable the use of labels for which further parameters can be needed to link a controllable device with its label.

In addition, in the basic configuration, the information presented in AR is based on the environment configuration (e.g. floor, walls, ceiling and planes) and do not take into account constraints given by the mobile device characteristics (such as its dimensions). Consequently the user can issue a voice command including, for example, a target position or a path that the device is not able to reach or follow owing to its dimensions. To overcome this problem, an embodiment of the present principles provide a system displaying AR information that depend on the device characteristics and that are more precise and relevant for the control of the mobile device. To obtain this information, the system can obtain further characteristics of controllable devices, for example when a new controllable device is added (i.e. registered) with the system.

For static controllable devices, as already mentioned, the system obtains the device type, e.g. light or shutter. In addition to this, the system could use labels for the static controllable devices. It is preferred that the labels are simple and intuitive, i.e. user friendly, without being ambiguous. For instance, in case, among the registered controllable devices in the living room, there is a single controllable shutter, then the system could assign the label "Shutter" or "Living Room Shutter" to it since there is no risk of identification ambiguity for the shutter type of devices.

In an embodiment, instead of or in addition to text labels, graphical information is used. The graphical information can be provided during a setup phase.

Figure 9:
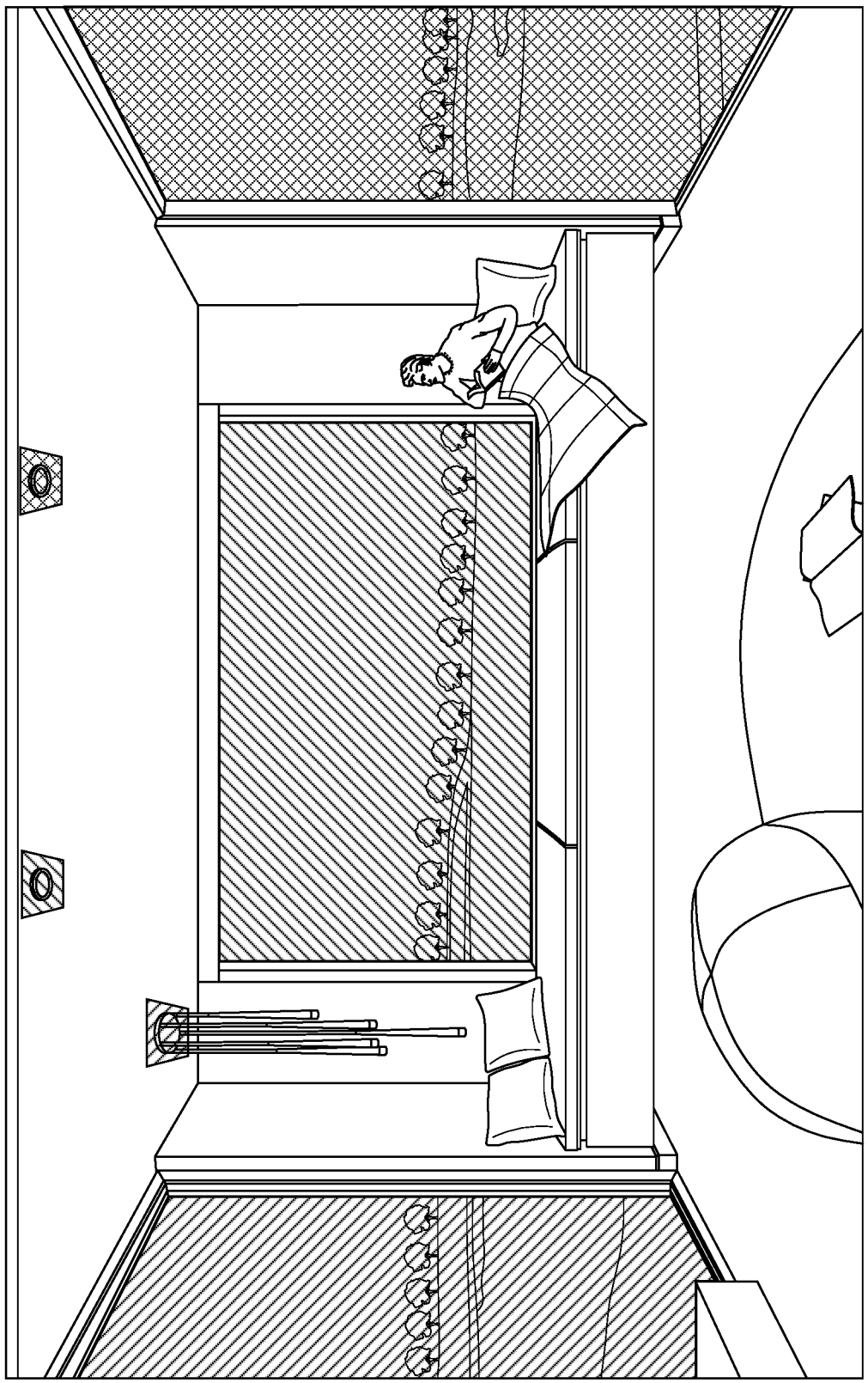
FIG. 9 illustrated an embodiment of the present principles in which colours are used as identifiers.

FIG. 9 illustrates an embodiment of the present principles in which colours are used as identifiers. In the example in FIG. 9, three lights and three shutters are identified using three different colours (illustrated by different hatchings); the lights are identified with shapes of different colours and the shutters are identified by the differently coloured window they are associated with. It is noted that it is possible to 'reuse' the colours between the lights and the shutters as, for example, the voice command "Switch on Green light" not only uniquely identifies the light among the three lights, but there is no possible ambiguity with the shutter that is of a different type of device.

In a variant, not illustrated, each wall is associated with a colour and any shutters in the wall can be identified by the corresponding colour.

As will be appreciated, the objective of the identifiers is to be able to identify unambiguously a specific device in a set such as a group of lights or shutters. The creation and population of groups can be performed by the server in a setup phase.

Figure 10:
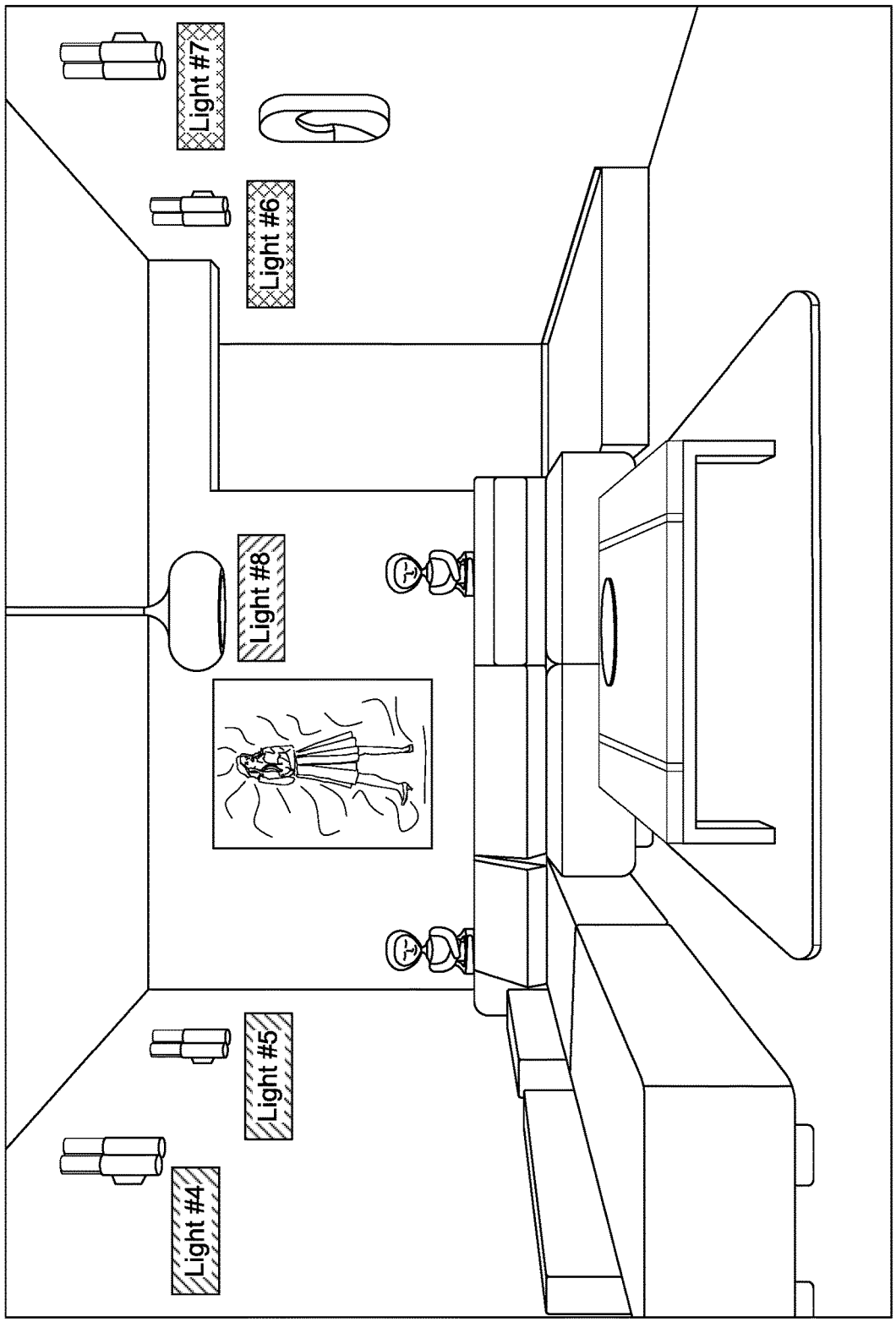
FIG. 10 illustrates an example of device grouping according to an embodiment of the present principles.

It is also possible to create personalized groups and subgroups. For example, there are typically many lights in a house that can be individually identified. The lights can also be grouped per room or part of a room. FIG. 10 illustrates an example of device grouping according to an embodiment of the present principles. FIG. 10 shows a living room with five lights, Light #4-Light #8. In the example, the lights on the left wall are in a first subgroup (green, represented by a first diagonal hatching), while the lights on the right wall are in a second subgroup (red, represented by cross hatching). In addition, all the lights in the living room can form a further group, "Living room lights" (not illustrated). The use of groups and subgroups can enable more diverse voice commands, such as:
  "Switch on/off light #5"
  "Switch on/off the lights of the green group," (i.e. the lights of the left wall)
  "Switch on/off the lights on the left wall," (i.e. the same as the above command, but differently worded)
  "Switch on/off all the lights in the living room"
  "Switch on/off all the lights of the 1st floor"
  "Switch on/off all the lights of the house"

It is noted that for some commands, like the last four, identifiers need not be displayed as these commands do not make use of the identifiers.

It is also noted that a group can be dynamic, for example including all the devices of a given type that are in the current user view. This can enable commands with an implicit identifier for all of these devices, e.g. "all these", such as "Switch on all these lights". A static group can also be created using the same principles, i.e. grouping all controllable objects of a given type in the current user view, e.g. "Create group 'work lights' including all these lights".

In addition to static identifiers, the system can also make use of dynamic identifiers. Such dynamic identifiers can depend on the context, such as current user location and orientation with respect to controllable devices. Dynamic identifiers can build upon prior identification and labelling of spaces such as rooms.

For a plurality of controllable devices of the same type, the labelling can could be twofold: a permanent and unique label amongst all the controlled object of the same type, and a dynamic label linked to the permanent label and depending on the current user location and orientation with respect to the controllable device. For instance, with four controllable shutters in an area such as a house, two in the living room (one in the north wall, one in the west), one in the kitchen and one in the bedroom, the permanent labelling could be:

First shutter, north wall of the living room: "living room shutter North"
Second shutter, west wall of the living room: "living room shutter West"
Third shutter, in the kitchen: "kitchen shutter"
Fourth shutter, in the bedroom: "bedroom shutter"

During use, the AR User Interface can be adjusted dynamically to simplify (i.e. shorten) the identifiers, while still presenting multiple choice if needed. For example, if the user view only includes one shutter, then the label can be dynamically simplified to "shutter" with no additional description.

Mobile controllable devices, however, can be treated in a slightly different manner. Since these devices are mobile, information about (possible) device moves are of interest to the user, for example target/destination position and area to move in, and optionally current position and path to follow. As previously mentioned, information based only on the scene configuration is not always relevant as it may propose impossible options to the user because of the device dimensions.

Hence, the system can refine the information to provide a suitable space, a "navigable map," in which the mobile device can move.

In one embodiment, the system has no information about the device characteristics and the robot generates the navigable map during exploration, essentially moving throughout the area and generating the navigable map by discovering the area in an autonomous way, for example using LiDAR and computational modules. The navigable map includes only the area in which the device can move. The mobile device can send the navigable map to the server that stores and, when necessary, uses it.

In a variant embodiment, the system has no information about the device characteristics but refines a grid of the area through which the mobile device moves based on feedback from the mobile device. Areas reached by the mobile device are marked as reachable, whereas areas not (yet) reached are marked as unreachable.

In another embodiment, the server computes the navigable map based on device characteristics and constraints, and a 3D model or bounding shape of the environment (i.e. the area).

Figure 11:
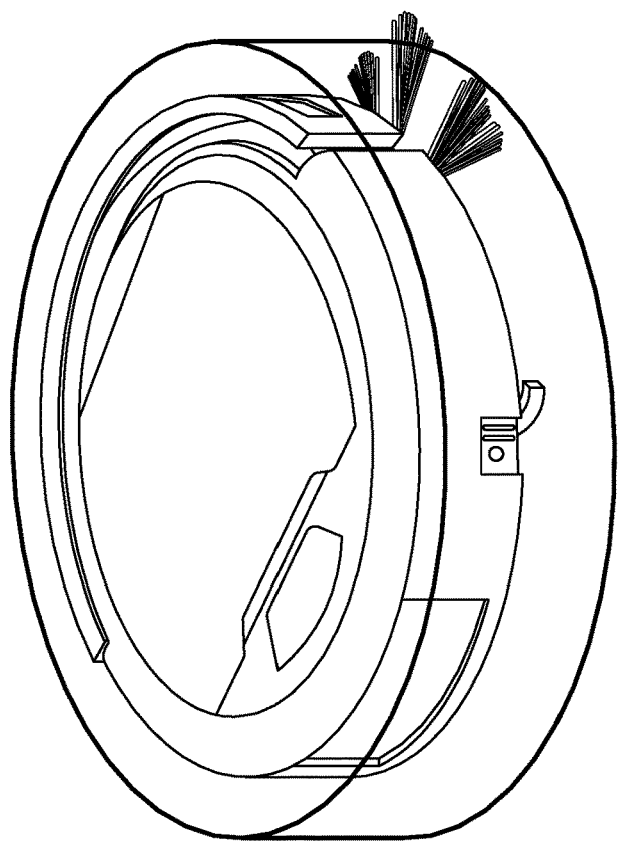
FIG. 11 illustrates two examples of bounding shapes for a mobile device.
Figure 11:
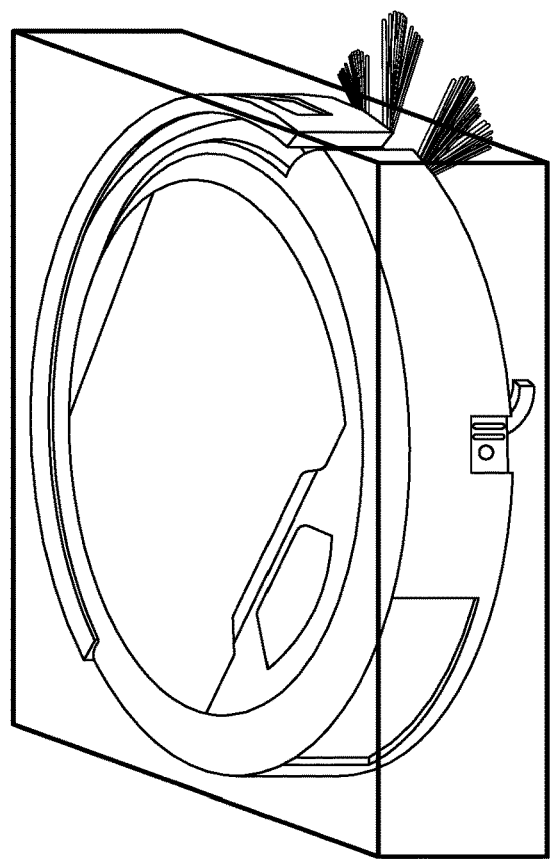

During device registration, for example, the shape (3D model of the object) or bounding shape (the 3D model of shape approximating and containing the device) of a controllable device can be obtained. The 3D model or bounding shape may be provided by the device manufacturer (e.g. via the device itself or downloadable from the manufacturer's website) or set by a user. FIG. 11 illustrates two examples of bounding shapes for a mobile device. As can be seen, the robot is approximated as a box to the left and as a cylinder to the right).

Using the environment data and the (bounding) shape, the server can obtain the navigable map by refining the grids, be they 2D or 3D, to keep only the cells (space or volume) to or in which the mobile device can move.

In 2D, a controllable device can move on or through:
A horizontal plane such as a floor or a table (e.g. a robot vacuum cleaner).
A vertical plane such as a wall or a window (e.g. a robot window cleaner).
A ground with relief (i.e. a slope). For example, the slope of a garden often has no impact on the limits of a mower's moves. The mower follows the ground along 2D coordinates. So even in the presence of a slope, a grid mapped to the ground can be considered as a 2D map since the height is not used by the mower. However, the grid should be superimposed correctly over the real world scene, so environment data should still be provided as 3D coordinates.

In an illustrative example, a device moves across a floor, but it will be understood that the principle also applies to a device moving in the vertical plane or over a slopy ground.

The system can determine the areas where the device can move by removing cells containing obstacles. In other words, the server estimates the parts of the 2D space the robot cannot enter by using robot dimensions (or its mesh) or the bounding shape approximating the robot as previously mentioned, for example from the 3D model of the scene and the map of the floor.

Figure 12:
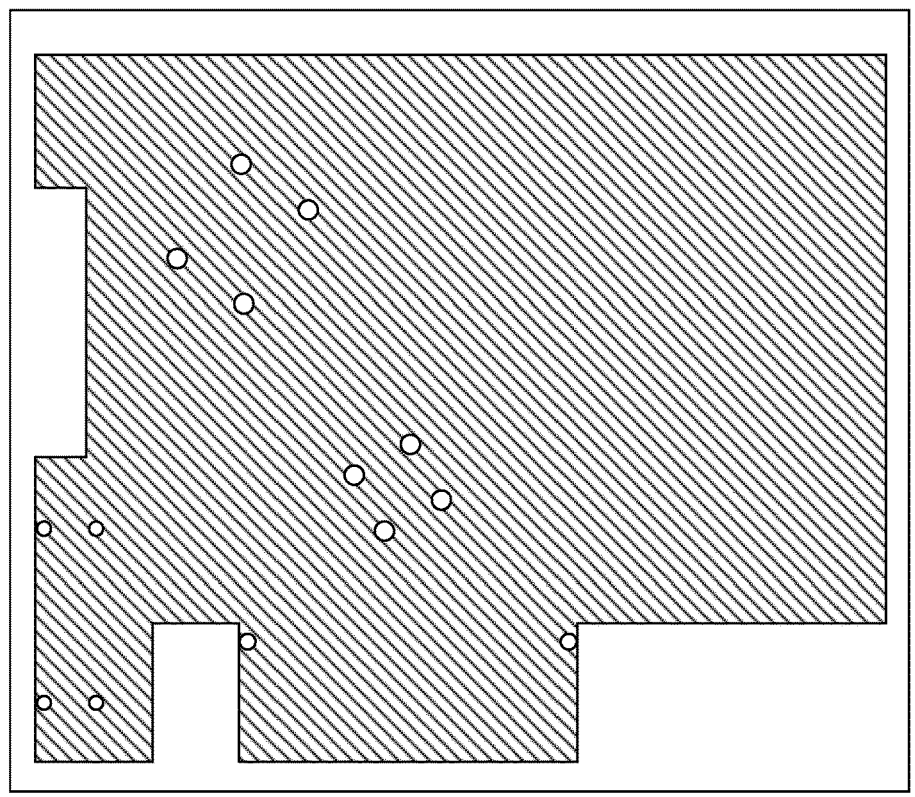
FIG. 12 illustrates an example with, to the left, a room seen from above and, to the right, a corresponding "navigable map"
Figure 12:
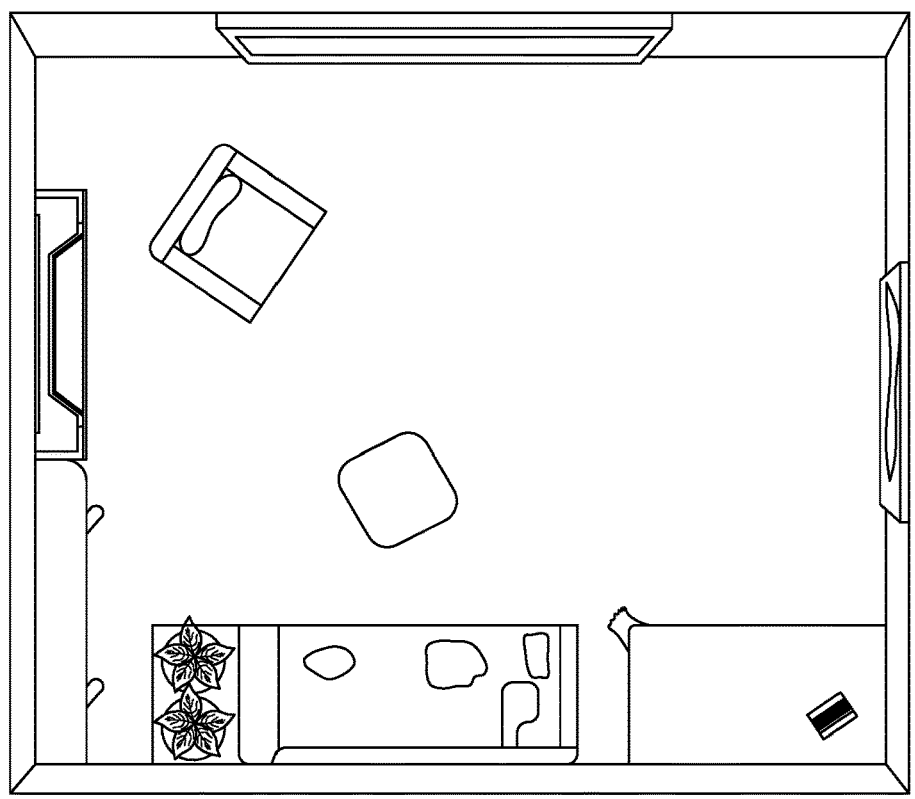

FIG. 12 illustrates an example with, to the left, a room seen from above and, to the right, a corresponding "navigable map" represented in red. It is noted that the robot can move under some furniture but not all. The navigable map can be represented in various ways, for example:

An image, like the one illustrated in FIG. 12, in which pixels can have one of two colours (one for the navigable part and one for the non-navigable one) and a way to express the pixels in the reference coordinates (e.g. by providing the reference coordinates of the image corners).
By providing the coordinates of the navigable part (in FIG. 12, it could be the contour of the red part and a list of shape contours to remove, i.e. mainly the circles representing the seat feet).

It is noted that the navigable map depends on the characteristics of the mobile device; two robots with different bounding shapes can have different navigable maps as one may be unable to reach the same areas as the other, which may happen if for example a robot vacuum cleaner is unable to get under a couch while the other can. It follows that a navigable map computed for one device may differ from that computed for another device.

As mentioned, the principle of computing navigable maps in 2D can be extended to a drone moving in a 3D space/volume. The 3D navigable maps includes the 3D space/volume the drone reach.

The AR application running on the AR device is configured to display in AR the information associated with controllable devices, as previously mentioned. To do this, the AR application retrieves the information, e.g. by requesting all available information (i.e. for all registered devices)

or only the information related to one or more given types of devices (e.g. only for the RVC or only for the lights).

The AR application can be configured to display all the retrieved information simultaneously or a subset thereof, e.g. in response to user selection. As already mentioned, the user can configure and personalise the way the information is presented, provided that the system can make the correspondence between the words and the targeted device and command.

It is also noted that a user does not need to have a mobile device in the current user view to issue controls to it. This may for example happen if a robot vacuum cleaner is out of sight in its docking station when the user issues a command to vacuum one or more cells.

Figure 13:
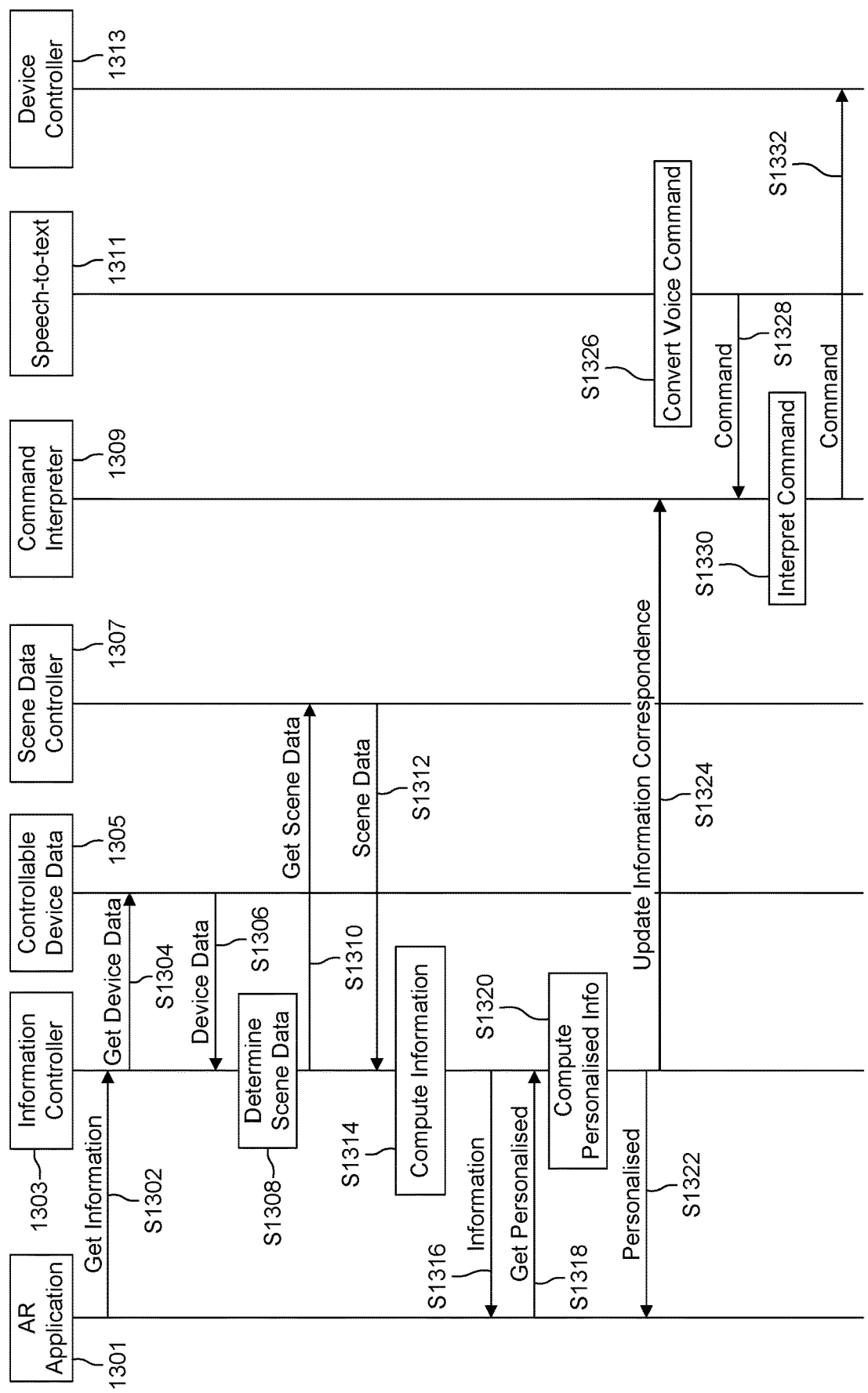
FIG. 13 illustrates an example of a sequence diagram of the system at run-time according to embodiment of the present principles.

FIG. 13 illustrates an example of a sequence diagram of the system at run-time according to embodiment of the present principles. The sequence diagram includes a number of modules and interactions, but it is noted that not all the embodiments are included, notably the embodiment in which the navigable map is provided by the robot itself.

In step S1302, the AR application 1301 requests information for a given scene and for a device (e.g. the RVC) or a set of devices (e.g. the lights) from an information controller 1303. The request can also be for several types of devices, but it is also possible to send a plurality of requests, each request being for a device or set of devices. The request can be limited to the current user view.

In step S1304, the information controller 1303 requests relevant information from a controllable device data repository 1305 that has access to a data set for each device (e.g. label, position, and bounding shape).

In step S1306, the controllable device data repository retrieves and returns the relevant information, i.e. information regarding controllable devices in the scene or user view as requested in step S1304, to the information controller 1303 that, in step S1308 determines the type of scene data of interest (e.g. scene corners, planes, and bounding shape) and, in step S1310, requests this data from a scene data controller 1307, which has access to the computed/processed scene data.

The scene data controller 1307 retrieves the relevant scene data that it, in step S1312, returns to the information controller 1303. In step S1314, the information controller 1303 computes and, in step S1316, returns the information (e.g. the origin and axes for a grid) to the AR application 1301 in charge of rendering. The AR application 1301 can render (e.g. overlay) all of part of the received information, e.g. labels identifying devices or groups of devices, as already described. Whether the received information is rendered or not can depend on whether the information relates to controllable objects within the user view (in which case it typically is rendered) and/or on whether the information relates to a device (type) of interest to the user. As an example, the AR application 1301 can render information about lights (but not shutters) within (but not outside) the user view.

As mentioned, the user can personalize/adapt the information. In step S1318, the AR application 1301 sends a request to the information controller 1303 to obtain personalized information. The information controller 1303 computes personalized information, in step S1320, and returns the personalised information, in step S1322. As already described, personalization can concern the way to identify the grid cells (e.g. row/columns, label, color . . . ), their size and the way to identify a static controllable device (e.g. grid cell, label, color . . . ). The AR application 1301 also provides, in step S1324, the updated information to a command interpreter 1309.

In step S1326, a natural language interpreter 1311 converts a received user voice command to text that it, in step S1328, transmits to the command interpreter 1309 that, in step S1330, interprets the text of the command, i.e. converts the text to a device command. The command interpreter 1309 can for example determine the concerned device from its label (e.g. RVC or light 1) or its type and position (e.g. light in B3 or green light) for instance. For a mobile controllable device, the command may also contain a target position or an area that the command interpreter 1309 obtains by converting the position/location data in the voice command (e.g. a grid identifier) to the reference coordinates. In step S1332, the command interpreter 1309 sends the command to the device controller 1313 that interacts with the controllable device (not shown).

It will be appreciated that one or more of the modules illustrated in FIG. 13 can be implemented in a device such as an AR device.

It will thus be appreciated that the present principles can provide an AR system for controlling devices through voice commands.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The invention claimed is:

1. A system comprising:
   a camera configured to capture a user view of a scene surrounding the camera;
   a display;
   memory configured to store instructions, executable by a processor, and to store parameters;
   an input interface configured to receive user commands intended to control at least one controllable object; and
   at least one hardware processor configured to execute the instructions to:
   detect controllable objects in the user view; and
   on condition that the controllable objects comprise multiple controllable objects of a same object type and that a received first command related to the same object type is ambiguous:
   obtain disambiguating information for the multiple controllable objects of the same object type, the disambiguating information suitable for uniquely identifying at least two subsets of controllable objects of the same object type; and
   cause the disambiguating information to be displayed, overlaid on the user view, on the display.

2. The system of claim 1, wherein at least one subset comprises a plurality of controllable objects.

3. The system of claim 1, wherein the at least two subsets each comprise a single controllable object of the same object type.

4. The system of claim 1, wherein a received second command comprises at least part of the disambiguating information; and
   wherein the system further comprises a communication interface configured to send a message based on the received second command towards a corresponding controllable object.

5. The system of claim 1, wherein the input interface is a microphone and the first command is a voice command.

6. The system of claim 1, wherein the at least one hardware processor is further configured to execute the instructions to create a group of controllable objects upon reception of a message that is based on a third command and that comprises identifiers of controllable objects to be included in the group, and to associate the group with disambiguating information uniquely identifying the group.

7. The system of claim 1, wherein the at least one hardware processor is further configured to execute the instructions to, upon reception of a fourth command including a type and an indication that the fourth command relates to all controllable objects of the type in the user view, control every controllable object in the user view.

8. The system of claim 1, wherein the system is implemented in an Augmented Reality, AR, device.

9. A method comprising:
   receiving, at an input interface, a first command intended to control at least one controllable object;
   detecting controllable objects in a user view captured using a camera; and
   on condition that the controllable objects comprise multiple controllable objects of a same object type and that the first command related to the same object type is ambiguous:
   obtaining disambiguating information for the multiple controllable objects of the same object type, the disambiguating information suitable for uniquely identifying at least two subsets of controllable objects of the same object type; and
   displaying, overlaid on the user view, the disambiguating information on a display.

10. The method of claim 9, wherein at least one subset comprises a plurality of controllable objects.

11. The method of claim 9, wherein the at least two subsets each comprise a single controllable object of the same object type.

12. The method of claim 9, wherein a second received command comprises at least part of the disambiguating information; and
    wherein the method further comprises sending, through a communication interface, a message based on the second received command towards a corresponding controllable object.

13. The method of claim 9, wherein the input interface is a microphone and the first command is a voice command.

14. The method of claim 9, further comprising:
    creating a group of controllable objects upon reception of a message that is based on a third command and that comprises identifiers of controllable objects to be included in the group; and
    associating the group with disambiguating information uniquely identifying the group.

15. The method of claim 9, further comprising, upon reception of a fourth command including a type and an indication that the fourth command relates to all controllable objects of the type in the user view, controlling every controllable object of the type in the user view.

16. The method of claim 9, wherein the method is implemented in an Augmented Reality, AR, device.

17. A non-transitory computer-readable storage medium storing instructions that, when executed, cause at least one hardware processor to perform a method of claim 9.

18. A system comprising:
    a camera configured to capture a user view of a scene surrounding the camera;
    a display;
    memory configured to store instructions, executable by a processor, and to store parameters;
    at least one hardware processor configured to execute the instructions to:

detect a plurality of controllable objects in the user view;
receive a user command specifying a type of object to be controlled;
on condition that the plurality of controllable objects include a single controllable object of the type of object, send a control message corresponding to the user command intended for the single controllable object of the type of object; and
on condition that the plurality of controllable objects comprise a plurality of controllable objects of the type of object:
obtain disambiguating information for the plurality of controllable objects of the type of object, the disambiguating information suitable for uniquely identifying at least two subsets of the plurality of controllable objects of the type of object; and
cause the disambiguating information to be displayed, overlaid on the user view, on the display.

19. A method comprising:
detecting a plurality of controllable objects in a user view captured by a camera;
receiving a user command specifying a type of object to be controlled;
on condition that the plurality of controllable objects includes a single controllable object of the type of object, sending a control message corresponding to the user command intended for the single controllable object of the type of object; and
on condition that the plurality of controllable objects comprise a plurality of controllable objects of the type of object:
obtaining disambiguating information for the plurality of controllable objects of the type of object, the disambiguating information suitable for uniquely identifying at least two subsets of the plurality of controllable objects of the type of object; and
causing the disambiguating information to be displayed, overlaid on the user view, on the display.

20. A non-transitory computer-readable storage medium storing instructions that, when executed, cause at least one hardware processor to perform a method of claim 19.

* * * * *